United States Patent
Uboldi et al.

(10) Patent No.: US 8,944,701 B2
(45) Date of Patent: Feb. 3, 2015

(54) CONNECTOR PART FOR AN OPTICAL PLUG-IN CONNECTION

(75) Inventors: Harry Uboldi, Gordola (CH); Dionigi Fantini, Ghirla (IT)

(73) Assignee: Diamond SA, Losone (CH)

( * ) Notice: Subject to any disclaimer, the term of this patent is extended or adjusted under 35 U.S.C. 154(b) by 0 days.

(21) Appl. No.: 13/143,368

(22) PCT Filed: Feb. 4, 2010

(86) PCT No.: PCT/EP2010/051332
§ 371 (c)(1),
(2), (4) Date: Jul. 6, 2011

(87) PCT Pub. No.: WO2010/089336
PCT Pub. Date: Aug. 12, 2010

(65) Prior Publication Data
US 2011/0268393 A1    Nov. 3, 2011

(30) Foreign Application Priority Data
Feb. 5, 2009 (CH) .................................. 0164/09

(51) Int. Cl.
*G02B 6/36* (2006.01)
*G02B 6/38* (2006.01)
G02B 6/255 (2006.01)

(52) U.S. Cl.
CPC ............ *G02B 6/3846* (2013.01); *G02B 6/3855* (2013.01); *G02B 6/2558* (2013.01); *G02B 6/3861* (2013.01)
USPC ................... 385/77; 385/53; 385/65; 385/83; 385/88; 385/94

(58) Field of Classification Search
CPC ........ G02B 6/36; G02B 6/387; G02B 6/3873; G02B 6/3874
USPC ........... 385/53, 55, 76, 77, 78, 88, 89, 92, 93, 385/94
See application file for complete search history.

(56) References Cited

U.S. PATENT DOCUMENTS 4,948,222 A * 8/1990 Corke et al. ................. 385/100
5,818,993 A * 10/1998 Chudoba et al. ............... 385/81
(Continued)

FOREIGN PATENT DOCUMENTS

| EP | 0 864 888 A1 | 9/1998 |
| JP | 3014250 B2 | 12/1999 |
| JP | 2002-82257 A1 | 3/2002 |
| JP | 2005-250294 A | 9/2005 |

(Continued)

*Primary Examiner* — Kaveh Kianni
*Assistant Examiner* — Hung Lam
(74) *Attorney, Agent, or Firm* — Nath, Goldberg & Meyer; Jerald L. Meyer; Leonid D. Thenor (57) ABSTRACT

A connector part for an optical plug-in connection includes a connector pin, in which an optical waveguide stub extending over a longitudinal center axis is held, and a sleeve-like pin holder. The pin holder includes a pin accommodating section, in which the connector pin is held, and an optical waveguide accommodating section, to which the end of an optical waveguide cable can be fixed in a tension-resistant manner. The optical waveguide accommodating section includes at least two jacket parts that can be connected to each other, wherein at least one jacket part can be fastened to the pin accommodating section using a joint so that the jacket part can be swiveled about a certain swivel angle between an open position and a closed position. The optical waveguide stub can be welded to an optical waveguide end on the cable side.

12 Claims, 5 Drawing Sheets

(56) References Cited

U.S. PATENT DOCUMENTS

| | | | |
|---|---|---|---|
| 2005/0175291 A1* | 8/2005 | De Marchi | 385/86 |
| 2005/0244108 A1* | 11/2005 | Billman et al. | 385/60 |
| 2006/0115219 A1* | 6/2006 | Mudd et al. | 385/62 |
| 2009/0022457 A1* | 1/2009 | de Jong et al. | 385/96 |

FOREIGN PATENT DOCUMENTS

| | | |
|---|---|---|
| WO | 96/31795 A1 | 10/1996 |
| WO | 2004/001471 A1 | 12/2003 |
| WO | 2004/001472 A1 | 12/2003 |
| WO | 2009/011799 A1 | 1/2009 |

* cited by examiner

Fig. 11

CONNECTOR PART FOR AN OPTICAL PLUG-IN CONNECTION

This is a National Phase Application filed under 35 U.S.C. §371 as a national stage of PCT/EP2010/051332, filed on Feb. 4, 2010, an application claiming the benefit under 35 U.S.C. §119 of Swiss Patent Application No. 00164/09, filed on Feb. 5, 2009, the content of each of which is hereby incorporated by reference in its entirety.

The present invention relates to a plug part for an optical plug-in connection in accordance with the preamble of claim 1.

Such plug parts are preassembled in the factory, the connection to the actual optical waveguide cable being made directly on the plug part by means of welding under field conditions. The purpose of the preassembly is that the difficult centering and fixing of the optical waveguide in the plug pin and the complex polishing process can be performed under suitable factory conditions.

Plug parts are known, for example, from prior art documents WO 96/31795 A1 and EP 864 888 A1. In order to attach the welding electrodes, in this case special openings or cutouts are provided. One disadvantage of these plug parts consists in that the weld point itself is poorly accessible and in that observation of the welding process is also made more difficult.

A plug part is also known from WO 2004/001472 A1, in accordance with which two casing parts can be pivoted out of the longitudinal mid-axis of the plug part, with the result that there is optimum accessibility to the end of the preassembled optical waveguide stub for welding purposes. After the welding process, the two casing parts are provided with an adhesive and are pivoted back into their initial position and adhesively bonded. Journals and journal openings ensure correct positioning in the process. The two casing parts are designed in such a way that, firstly, they surround the casing of an optical waveguide tightly and, secondly, they envelop the weld point of the optical waveguide without any force. This plug part has a relatively complex configuration and needs to be manufactured with precision. In addition, the two casing parts or the optical waveguide are intended to be provided with an adhesive under field conditions, which requires well trained personnel.

WO 2009/011799 A1 describes a substantially conventional plug-in connector with an anti-kink sleeve. The anti-kink sleeve has a collar at its end remote from the plug. This collar is used for secure connection to a correspondingly formed splice protection means. The splice protection means consists of two individual casing parts. Each of the two casing parts has in each case one cushion-like element in its interior, said cushion-like elements enclosing the spliced fiber when the splice protection means is closed. These cushion-like elements can be formed by in each case one double-sided and cushioned adhesive tape. Such an external splice protection means lengthens the distance between the plug interface and the free cable and secondly places specific demands on the anti-kink sleeve, which should not demonstrate any length extension in particular in the case of tensile loading.

In the text which follows, the term optical waveguide is understood as meaning an optical fiber as such, while the term optical waveguide cable is understood as meaning one or more optical waveguides with one or more additional plastic sheaths and optional strain-relief means, for example in the form of aramid fibers.

In the text which follows, a plug part is understood as meaning part of a plug which comprises a plug pin and a fastening element for receiving an optical waveguide or an optical waveguide cable. Once equipped with an optical waveguide or optical waveguide cable, such a plug part can be introduced into a plug housing, with the result that, for example, a standardized plug-in connector is formed.

The object of the invention is to overcome the disadvantages of the prior art. In particular, the intention is to provide a plug part which makes the fiber stub easily accessible for welding and which can be fitted easily under field conditions. The intention here is to provide the possibility of performing both the preassembly and the final assembly of the plug part quickly and without any complex auxiliary means. Finally, the weld point is intended to be protected in optimum fashion from mechanical loading and from contamination as well as from environmental influences after final assembly.

This object is achieved by a plug part having the features in claim 1. Further embodiments are given in the dependent patent claims.

A plug part according to the invention for an optical plug-in connection has a plug pin and a bush-like pin holder, the pin holder comprising a pin receiving section and an optical waveguide receiving section. The pin receiving section of the pin holder receives the plug pin, while the end of an optical waveguide cable or an optical waveguide can be fixed in a manner resistant to tensile stress on the optical waveguide receiving section. The optical waveguide receiving section has at least two casing parts which can be connected to one another, at least one casing part being fastened or being able to be fastened on the pin receiving section using a hinge in such a way that the casing part can be pivoted through a predetermined pivot angle between an open position and a closed position. An optical waveguide stub is held in the plug pin, wherein said optical waveguide stub extends over a longitudinal mid-axis and can be welded to an end of an optical waveguide cable or an optical waveguide. In this case, that end of the optical waveguide stub which is intended to be welded is located in the region of the casing parts. At least one of the casing parts has at least one adhesive layer, which is preferably applied in the factory, for connecting the at least two casing parts. Owing to the fact that the adhesive layer for connecting the casing parts has already been provided, the fitting process under field conditions is considerably facilitated. In addition, the fitter does not need to carry any separate adhesive and it is not necessary for correct metering to be performed in situ. Likewise, contamination of sensitive plug and tool parts with adhesive as a result of inappropriate handling is avoided.

The adhesive layer is advantageously arranged in each case on one touching face of the casing parts, said touching face lying opposite the adjacent casing part. Thus, the casing parts can be connected to one another easily and the optical waveguide is surrounded on both sides.

The adhesive layer can be covered by a protective film prior to the processing of the plug part. As a result, the handling of the plug part is simplified, the casing parts do not adhere to one another in an undesirable manner and the adhesive layer is protected from contamination and drying out. If the protective film protrudes beyond the adhesive layer at least one point, it is more easily possible for the protective film to be gripped and removed.

The adhesive layer is advantageously elastic such that, when the two casing parts are pressed together and adhesively bonded, the welded optical waveguide which is located between the two casing parts or between the two adhesive layers is enveloped completely by the adhesive layers. At the same time, the welded optical waveguide is thus protected from environmental influences, such as moisture, for example. In addition, owing to the elasticity of the adhesive layer, unnecessary stresses on the weld point of the optical waveguide are avoided.

If the adhesive layer has a thickness of between 80 μm and 300 μm, in particular between 100 μm and 200 μm, preferably between 125 μm and 150 μm and the adhesive layer has corresponding elasticity, it is even possible to dispense with a groove in the casing part corresponding to the optical waveguide.

The adhesive layer can consist of a double-sided adhesive tape. This facilitates the preassembly of the plug part since the protective film is thus already provided as standard.

The adhesive tape can also consist of a substrate material and adhesive on both sides. Alternatively, an adhesive tape which only consists of an adhesive is also conceivable. Preferably, the adhesive is a substance suitable for optical fibers, for example an acrylic polymer.

The optical waveguide receiving section can have a top part for connection to the pin receiving section and two casing parts. The top part can have, for example, a snap-action closure which interacts with the pin receiving section. Owing to the fact that the optical waveguide receiving section and the pin receiving section are separated from one another, various materials with different properties can be used. The separation also has advantages in terms of the manufacture of the two parts.

In addition, at least one casing part is fastened to the top part using a hinge. Advantageously, the hinge is designed in such a way that the casing part can be pivoted through a specific pivot angle between an open position and a closed position. As a result, the casing part can be pivoted out of its initial position, in which it is parallel to the longitudinal mid-axis of the plug part, away from that end of the optical waveguide stub which is intended for welding, into an open position in order to perform the welding process. That end of the optical waveguide stub which is intended for welding is thus free and is easily accessible for the welding.

The pin receiving section and the optical waveguide receiving section with its casing parts can also be formed integrally. For example, the plug pin could be cast into the pin receiving section. Other types of fastening such as pressing-in or incorporation by adhesively bonding are likewise conceivable. Handling of the plug part in the field is thus simplified and the manufacture is made less expensive since there is no need for any further individual parts.

However, the pin holder can also consist of two shell parts, which can be assembled along the longitudinal mid-axis. It is likewise advantageous if in this case at least one casing part is fastened to a pin receiving section of one shell part using a hinge in such a way that the casing part can be pivoted through a specific pivot angle between an open position and a closed position. In this case, the two shell parts are each formed integrally, with the result that, in turn, only a few individual parts are provided.

The pin holder advantageously consists at least partially of a plastic material, in particular of polyphenylene oxide (PPO). It is furthermore advantageous if the hinge is a film hinge.

The casing parts can have positioning means which engage one inside the other for joining said parts with an accurate fit. Such positioning means have, for example, the form of protruding bolts or recesses or are simple journal/journal opening combinations. These positioning means ensure that the casing parts are assembled in a simple and reliable manner in the correct position.

The invention will be explained in more detail below with reference to figures, which merely illustrate exemplary embodiments and in which.

Figure 1:
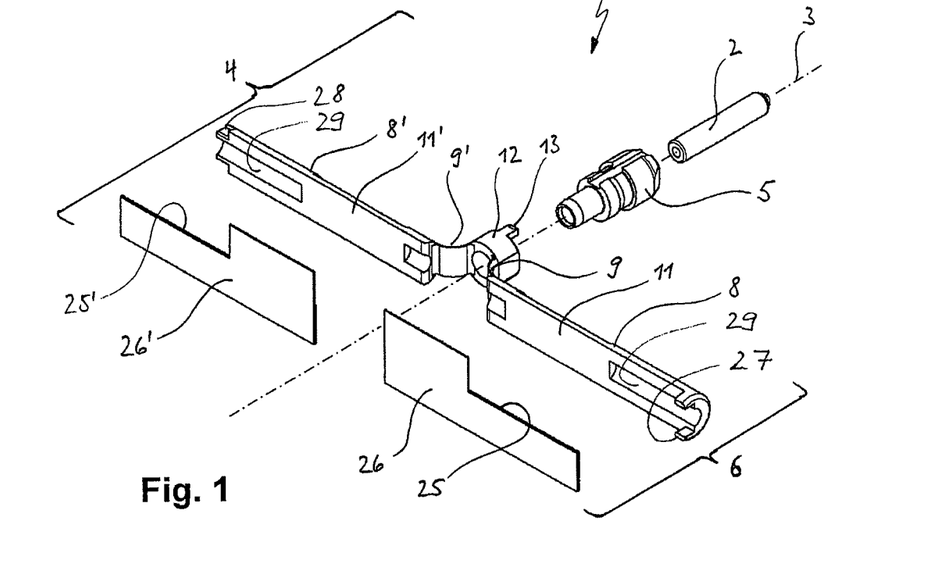
FIG. 1 shows an exploded illustration of a plug part according to the invention.

FIG. 1 shows an exploded illustration of a plug part 1 according to the invention arranged on a longitudinal mid-axis 3. The plug part 1 consists of a plug pin 2 and a pin holder 4, which comprises a pin receiving section 5 and an optical waveguide receiving section 6. The optical waveguide receiving section 6 has two casing parts 8, 8', which are connected to a top part 12 via in each case one hinge 9, 9' in the form of a film hinge. The top part 12 is used for connecting the optical waveguide receiving section 6 to the pin receiving section 5 and is substantially in the form of a bush. For this connection, the optical waveguide receiving section 6 and the pin receiving section 5 have locking means (not shown) which enable a simple snap-on connection. The top part 12 has a tab 13, which fits into a corresponding groove-shaped anti-rotation means 36 in the pin receiving section 5 and makes a rotation of the optical waveguide receiving section 6 relative to the pin receiving section 5 impossible. The two casing parts 8, 8' each have a touching face 11, 11' for receiving in each case one adhesive layer 25, 25' In this case, the two adhesive layers 25, 25' are protected on one side by a protective film 26, 26' In order to simplify the precise positioning as the two casing parts 8, 8' are closed, said casing parts have a positioning means in the form of protruding bolts 27 or recesses 28 at the cable-side ends of said casing parts. A groove 29 is formed in the casing parts 8, 8' in order t accommodate the cable-side waveguide therein.

Figures 2, 3:
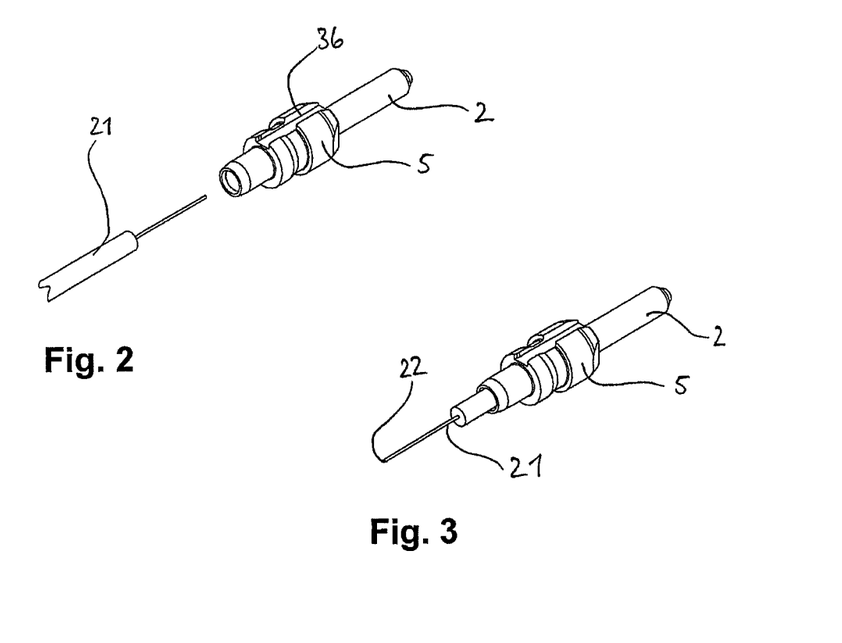
FIG. 2 shows a pin receiving section prior to fitting of the optical waveguide stub.
FIG. 3 shows the pin receiving section shown in FIG. 2 with the optical waveguide stub fitted.

FIG. 2 shows a pin receiving section 5 prior to fitting of the optical waveguide stub 21. In this case, the plug pin 2 is already fitted in the pin receiving section 5. Said plug pin can be pressed in, incorporated by adhesive bonding or encapsulated by the pin receiving section 5 being injection-molded directly around it. Other types of fastening are likewise conceivable. The pin receiving section has a groove-shaped anti-rotation means 36 parallel to the longitudinal axis of said pin receiving section, said anti-rotation means firstly being used to receive a tab of the optical waveguide receiving section (not shown) and secondly ensuring the aligned incorporation in a plug housing. The pin receiving section 5 has a through-bore, with the result that the optical waveguide of the optical waveguide stub 21 can be pushed from the side remote from the plug pin 2 through the pin receiving section 5 into the plug pin 2. In addition, this bore is expanded on the side remote from the plug pin 2, with the result that, in addition to the optical waveguide, a first plastic sheath of the optical waveguide stub 21 can also be received.

FIG. 3 shows the pin receiving section 5 shown in FIG. 2 with the optical waveguide stub 21 fitted. The optical waveguide stub 21 is incorporated in the pin receiving section 5 and the plug pin 2 by adhesive bonding. In addition, it has already been shortened to the correct length and that end 22 of the optical waveguide stub 21 which is intended to be welded protrudes out of the pin receiving section 5.

Figure 4:
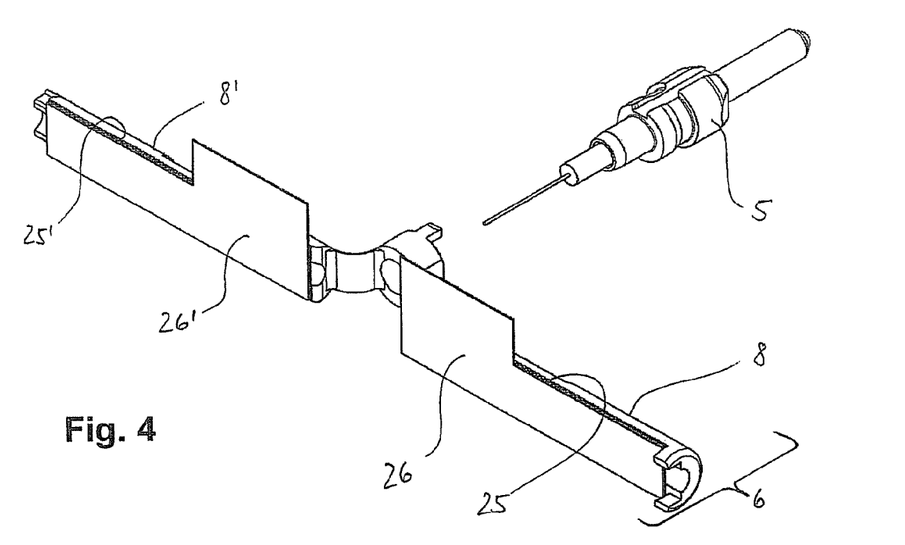
FIG. 4 shows the pin receiving section shown in FIG. 3 prior to the connection to the optical waveguide receiving section.

FIG. 4 shows the pin receiving section 5 shown in FIG. 3 prior to the connection to the optical waveguide receiving section 6. The casing parts 8, 8' of the optical waveguide receiving section 6 are equipped with the adhesive layers 25, 25' in the form of a double-sided adhesive tape and the corresponding protective films 26, 26'. The adhesive layer 25, 25' corresponds in terms of its size to the touching face 11, 11' (cf. FIG. 1). The protective film 26, 26' is in the form of an L and overlaps the adhesive layer laterally. Thus, the protective film 26, 26' can be gripped easily even under non-optimal environmental conditions and the adhesive layer 25, 25' can be exposed without any problems.

Figure 5:
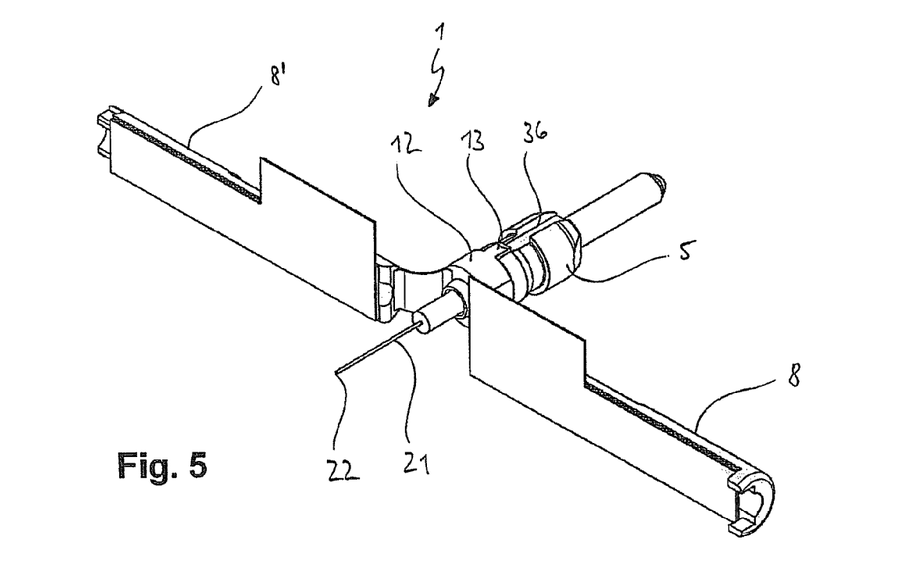
FIG. 5 shows the prefabricated plug part shown in FIG. 1.

FIG. 5 shows the prefabricated plug part 1 shown in FIGS. 1 and 4. The optical waveguide receiving section is placed with its top part 12 onto the pin receiving section 5 and secured by the locking means. The tab 13 of the top part 12 is located in the groove-shaped anti-rotation means 36 of the pin receiving section 5. The optical waveguide stub 21 protrudes through a bore in the top part 12, with the result that the end 22 to be welded comes to lie in the region of the two casing parts 8, 8' of the optical waveguide receiving section.

Figure 6:
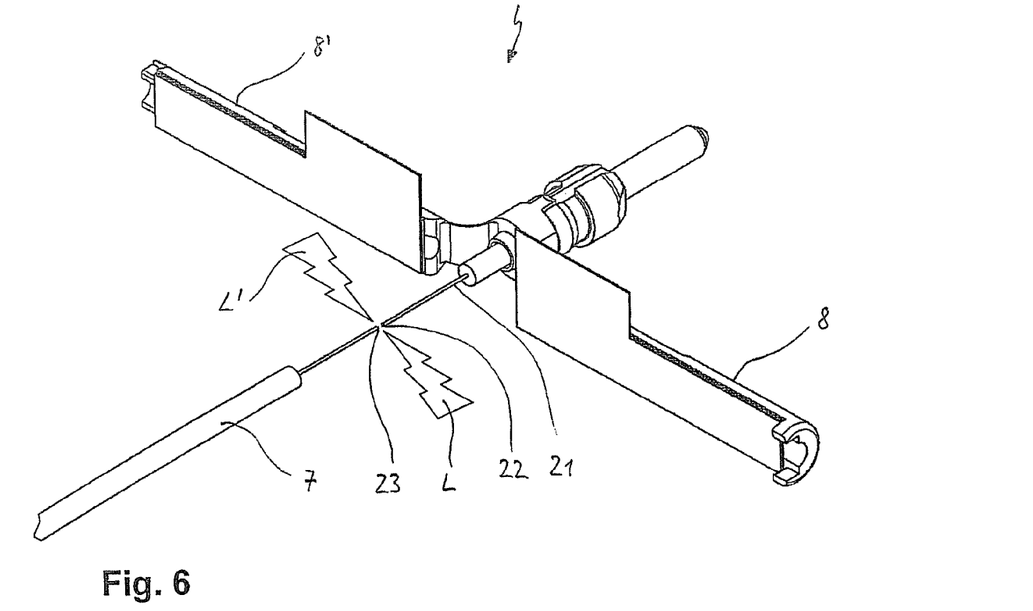
FIG. 6 shows the plug part shown in FIG. 5 during the welding operation.

FIG. 6 shows the plug part 1 shown in FIG. 5 during the welding operation. An optical waveguide end 23 from which the insulation has been stripped of an optical waveguide cable 7 is led up to that end 22 of the optical waveguide stub 21 which is intended to be welded and is welded thereto. The two arrows L, L' in this case represent the arc for welding the two ends 22, 23 of the optical waveguide. The two hinges 9, 9' enable pivoting of the two casing parts 8, 8' of the optical waveguide receiving section into the open position illustrated, with the result that that end 22 of the optical waveguide stub 21 which is intended to be welded or the optical waveguide end 23 of the optical waveguide cable 7 is freely accessible on all sides for the welding operation.

Figure 7:
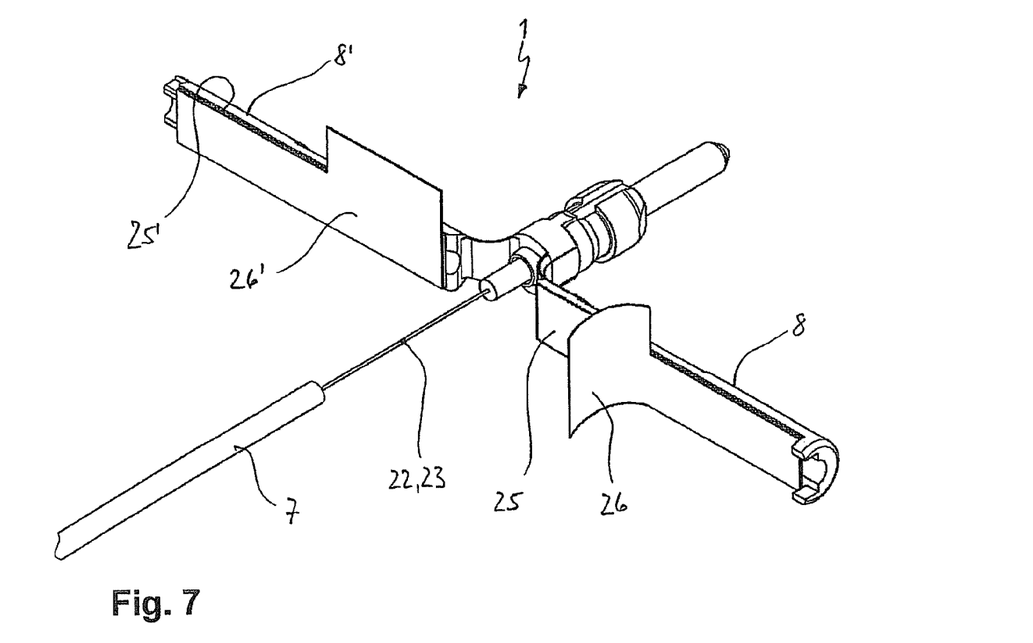
FIG. 7 shows the plug part shown in FIG. 6 during peeling-off of a protective film.

FIG. 7 shows the plug part 1 shown in FIG. 6 after the welding operation during peeling-off of the protective film 26. The optical waveguide cable 7 is connected to the plug part 1 and the two ends 22, 23 of the optical waveguide are welded to one another. Before the two casing parts 8, 8' are pivoted into their closed position, the protective film 26, 26' needs to be peeled off from each casing part 8, 8' so that the two adhesive layers 25, 25' are exposed.

Figure 8:
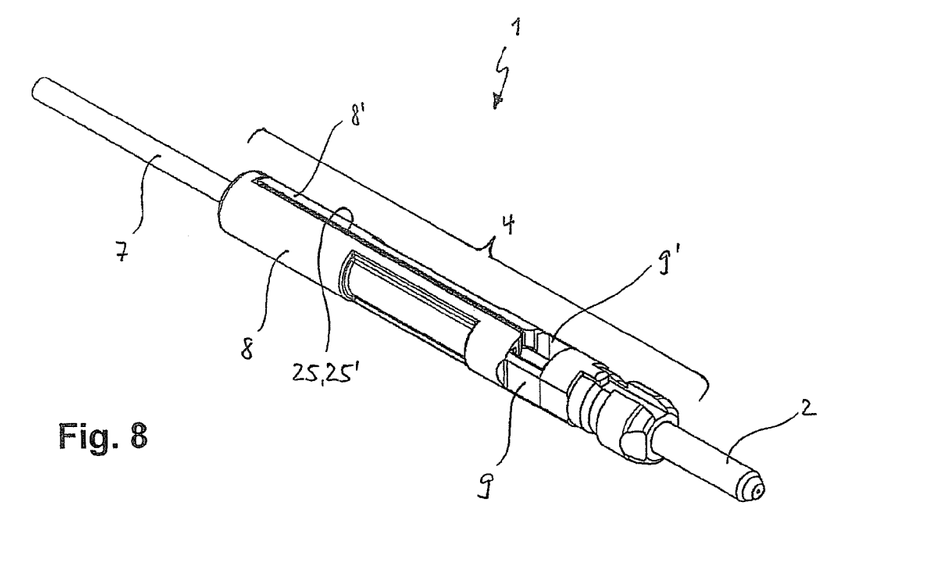
FIG. 8 shows the completely prefabricated plug part.

FIG. 8 shows the completely prefabricated plug part 1. The two casing parts 8, 8' are in their closed position and are held together by the two adhesive layers 25, 25'. The two hinges 9, 9' are extended. The optical waveguide cable 7, the pin holder 4 and the plug pin 2 form one unit.

Figure 9:
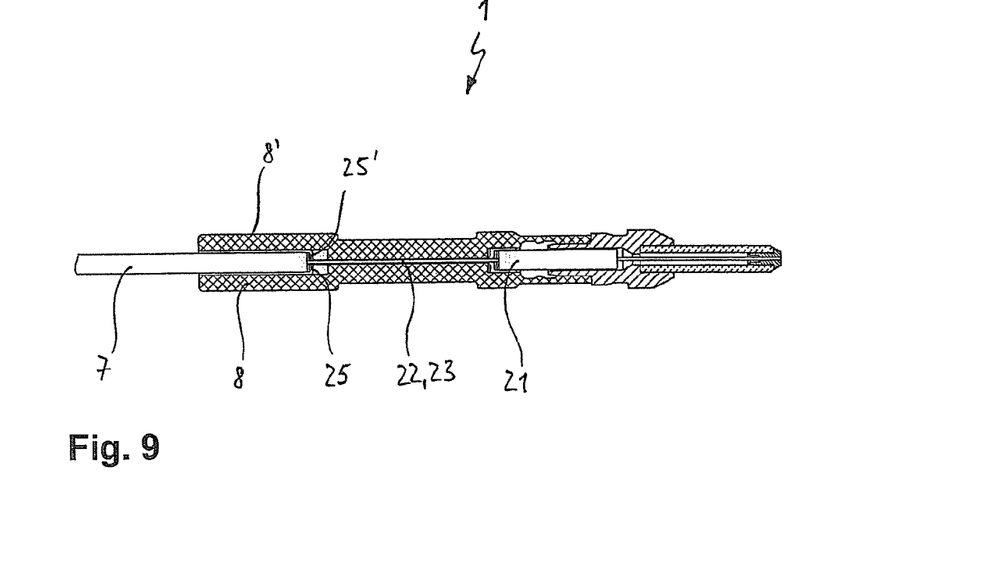
FIG. 9 shows a cross section through the plug part shown in FIG. 8.

FIG. 9 shows a cross section through the completely manufactured plug part 1 shown in FIG. 8. The ends 22, 23 of the optical waveguide cable 7 and the optical waveguide stub 21 which are welded to one another are embedded between the two casing parts 8, 8' and are completely surrounded by the adhesive layers 25, 25' and therefore fixed. Likewise, the first plastic casing of the optical waveguide cable 7 is also surrounded by the two adhesive layers 26, 26', with the result that a first strain-relief means is provided for the optical waveguide or the weld point.

Figure 10:
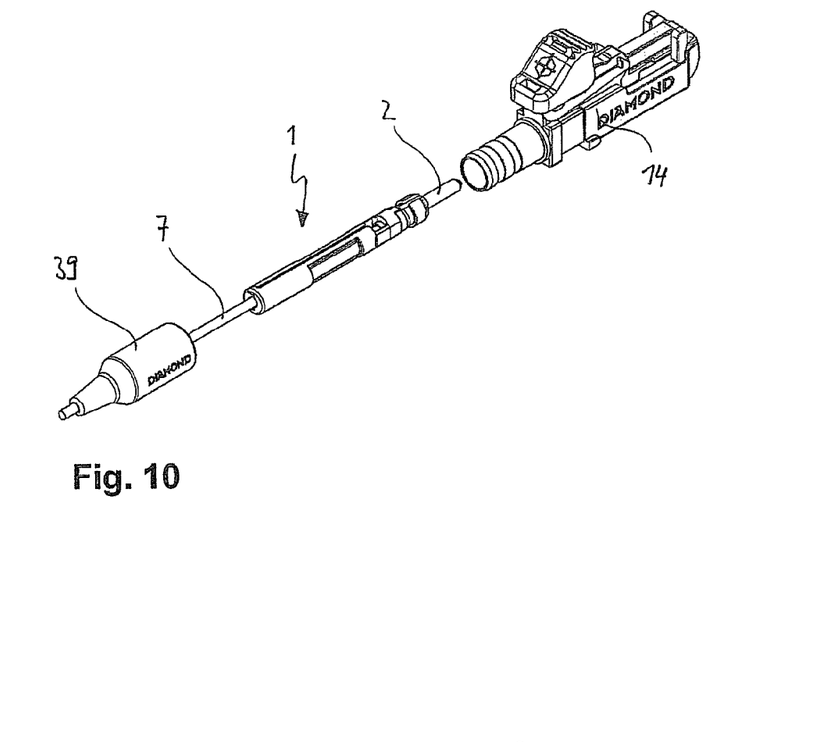
FIG. 10 shows the plug part shown in FIG. 8 prior to insertion into a plug housing.

FIG. 10 shows the plug part 1 shown in FIG. 8 prior to insertion into a corresponding plug housing 14. The plug part 1 is in this case plugged, with its plug pin leading, into the plug housing 14, where the plug part 1 latches. In order to protect against excessive bending loading of the optical waveguide cable 7, an anti-kink sleeve 39 is provided at the rear end of the plug housing 14.

Figure 11:
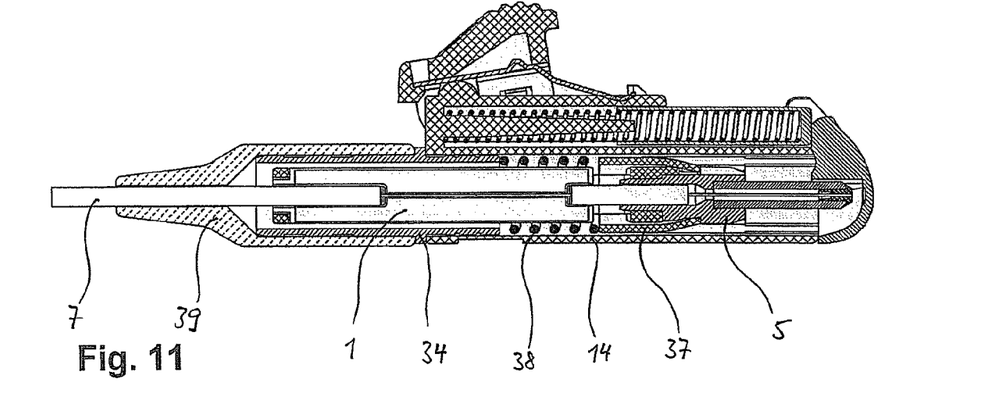
FIG. 11 shows a cross section through a completely assembled plug.

FIG. 11 shows a cross section through a completely assembled plug. The plug part 1 is in this case inserted into the plug housing 14. A latch-in cap 37 is used for securely holding the plug part 1 in the plug housing 14. Fingers of the latch-in cap 37 in this case engage into the peripheral groove in the pin receiving section 5 of the plug part 1. The latch-in cap 37 and therefore also the plug part 1 is mounted movably in the plug housing 14 counter to the force of a spring 38. In this case, the spring 38 is supported on the crimping neck 34, which delimits the plug housing at its rear end. The anti-kink means 39 is placed onto the crimping neck 34 and prevents excessive bending loading of the optical waveguide cable 7.

If the optical waveguide cable also has strain-relief means in the form of aramid fibers or the like and a further sheath, the strain-relief means can be connected fixedly to the crimping neck 34 with a crimping sleeve in a conventional manner. The anti-kink means is corresponding shaped in such a case such that it engages over the crimping sleeve.

The invention claimed is:

1. A plug part for an optical plug-in connection, comprising:
    a plug pin, in which an optical waveguide stub is held,
    said optical waveguide stub extending over a longitudinal mid-axis, and with a bush-like pin holder, comprising a pin receiving section, in which the plug pin is held in a fixed manner, and an optical waveguide receiving section, to which an end of an optical waveguide cable or an optical waveguide can be fixed in a manner resistant to tensile stress preventing any relative movement between said end of the optical waveguide cable or the optical waveguide and the plug pin,
    the optical waveguide receiving section having at least two casing parts which can be connected to one another,
    at least one casing part being fastened or being able to be fastened on the pin receiving section using a hinge in such a way that the casing part can be pivoted through a predetermined pivot angle between an open position and a closed position,
    wherein said optical waveguide receiving section in its closed position is non-moveable in relation to the plug pin and is non-moveable in the direction of the longitudinal mid-axis of the plug part,
    and the optical waveguide stub can be welded to a particular cable-side optical waveguide end, the end of the optical waveguide stub which is intended to be welded being located in the region of a touching face of the casing parts,
    wherein the touching face is substantially flat and the casing part exhibits at least at its cable-side end a recess to accommodate the first plastic casing of a waveguide end being welded to the waveguide stub,
    wherein at least one of said casing parts has at least one adhesive layer, which is preferably applied in the factory, for connecting said at least two casing parts in order to completely embed and to protect the optical waveguides which are welded to one another,
    wherein said adhesive layer consists of a double-sided adhesive tape covering the touching face, said adhesive tape further covering a groove for receiving the first casing of the cable-side waveguide in flat manner in order to surround the first plastic casing of the optical waveguide when the casing parts are closed and to provide a first strain-relief means for the optical waveguide.

2. The plug part as claimed in claim 1, wherein said adhesive layer is arranged in each case on one touching face of the casing parts, said touching face lying opposite the adjacent casing part.

3. The plug part as claimed in claim 1, wherein said adhesive layer is covered by a protective film prior to the processing of the plug part.

4. The plug part as claimed in claim 1, wherein said adhesive layer is elastic such that, when the two casing parts are pressed together and adhesively bonded, the welded optical waveguide which is located between the two casing parts or between the two adhesive layers is enveloped completely by the adhesive layers.

5. The plug part as claimed in claim 1, wherein said adhesive layer has a thickness of between 80 μm and 300 μm, in particular between 100 μm and 200 μm, preferably between 125 μm and 150 μm.

6. The plug part as claimed in claim 1, wherein said double-sided adhesive tape contains an adhesive consisting of an acrylic polymer.

7. The plug part as claimed in claim 1, wherein said optical waveguide receiving section has a top part for connection to the pin receiving section and two casing parts.

8. The plug part as claimed in claim 7, wherein at least one casing part is fastened to said top part using a hinge in such a way that the casing part can be pivoted through a specific pivot angle between an open position and a closed position.

9. The plug part as claimed in claim 1, wherein said pin receiving section and said casing parts of the optical waveguide receiving section are formed integrally.

10. The plug part as claimed in claim 1, wherein said pin holder consists of two shell parts, which can be assembled along the longitudinal mid-axis, and at least one casing part is fastened to a shell part using a hinge in such a way that said casing part can be pivoted through a specific pivot angle between an open position and a closed position.

11. The plug part as claimed in claim 8, wherein said pin holder consists at least partially of a plastic material, and in that said hinge is a film hinge.

12. The plug part as claimed in claim 1, wherein said casing parts have positioning means which engage one inside the other for joining said parts with an accurate fit.

* * * * *